United States Patent
Polidor et al.

(10) Patent No.: US 8,542,297 B2
(45) Date of Patent: Sep. 24, 2013

(54) METHOD FOR AUTOMATICALLY ADJUSTING THE LEVELS OF ILLUMINATION SOURCES IN AN OPTICAL MEASUREMENT MACHINE

(75) Inventors: Edward T. Polidor, Webster, NY (US); Daniel C. Abbas, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 227 days.

(21) Appl. No.: 13/204,097

(22) Filed: Aug. 5, 2011

(65) Prior Publication Data

US 2013/0033620 A1 Feb. 7, 2013

(51) Int. Cl.
*H04N 5/262* (2006.01)

(52) U.S. Cl.
USPC ............ 348/240.99; 348/370; 356/614

(58) Field of Classification Search
USPC .............. 348/240.99, 370; 356/614
See application file for complete search history.

(56) References Cited

U.S. PATENT DOCUMENTS

| | | | |
|---|---|---|---|
| 5,389,774 A | 2/1995 | Gelman et al. | |
| 6,627,863 B2 | 9/2003 | Wasserman | |
| 7,092,860 B1 | 8/2006 | Wasserman | |
| 2001/0038414 A1 | 11/2001 | Hofer et al. | |
| 2004/0264758 A1 | 12/2004 | Christoph | |
| 2011/0170181 A1* | 7/2011 | Yoshikawa et al. | 359/385 |
| 2011/0261208 A1* | 10/2011 | Wang et al. | 348/187 |

FOREIGN PATENT DOCUMENTS

| | | |
|---|---|---|
| EP | 1 319 164 51 | 6/2003 |
| EP | 1458182 A1 | 9/2004 |
| WO | 2010-050058 A1 | 5/2010 |

OTHER PUBLICATIONS

PCT Notification of Transmittal of the International Search Report and the Written Opinion of the International Searching Authority, or the Declaration dated Dec. 17, 2012 in corresponding PCT Patent Application No. PCT/US2012/049118 (2 pages).
PCT International Search Report dated Dec. 17, 2012 in corresponding PCT Patent Application No. PCT/US2012/049118 (4 pages).
PCT Written Opinion of the International Seaching Authority, or the Declaration dated Dec. 17, 2012 in corresponding PCT Patent Application No. PCT/US2012/049118 (4 pages).

\* cited by examiner

*Primary Examiner* — Anthony J Daniels
(74) *Attorney, Agent, or Firm* — Brian B. Shaw, Esq.; Thomas B. Ryan; Harter Secrest & Emery LLP

(57) ABSTRACT

A process for pre-calibrating illumination sources permits illumination light intensities to be set to a near optimal level during training of an optical inspection system. Applicants have found that the illumination source intensities for a category of illuminators are sufficiently constant from machine to machine that the data collected during calibration of an illumination source on a machine using a particular type of source may be used on other machines of the same type using the same type of illumination source when combined with the reticle light intensity data for different zoom magnification's of the particular machine being used. That is, using known data for particular machine and the illumination source light intensity data for the same type of machine and illumination source permits accurate presetting of an illumination source.

13 Claims, 4 Drawing Sheets

METHOD FOR AUTOMATICALLY ADJUSTING THE LEVELS OF ILLUMINATION SOURCES IN AN OPTICAL MEASUREMENT MACHINE

BACKGROUND OF THE INVENTION

1. Technical Field

This invention relates generally to optical imaging systems for measuring part coordinates and more particularly to such systems having a controller for automatically presetting the level of one or more illumination sources to enhance the accuracy of the measurement.

2. Description of the Related Art

Optical imaging systems for measuring part coordinates have the advantage of allowing measurements to be made without contacting the part being measured. Optical imaging systems have the complication, however, of being sensitive to proper lighting of the part being measured. If light levels are too low, the signal created by the imaging system may be too low compared with noise levels to allow accurate measurement. If light levels are too high, saturation of the image will cause measurement errors because the image blooms and edges in the image move from their true locations.

Modern optical measurement systems often have multiple illumination sources, e.g. co-axial lights, backlights, and oblique lights. Each of the illumination sources must be set at an appropriate illumination level to produce accurate measurements.

In addition to the increasing number of illumination sources that may be used and adjusted simultaneously to make accurate measurements, modern measurement systems often include zoom lenses. When the magnification of a zoom lens is changed, the light collection efficiency of the lens usually changes. This causes a change in the portion of the light from the illumination source(s) that contributes to the image. Consequently the levels of the illumination sources usually need to be adjusted whenever the lens magnification is changed to achieve optimum measurement accuracy.

From measurement system to measurement system the sensitivity of the camera and the gain of the signal processor may differ. Even for a given machine, sensitivity of the camera and the signal processing gain may be changed from time to time to optimize certain optical measurements. These differences in detection sensitivity also usually result in a different illumination light source intensity being required for optimum measurement accuracy.

Traditionally, automatic part measurement programs for particular parts have been developed in a learning mode. The operator puts an optical measurement system into a manual mode, selects the sequence of measurement steps he wants for that part, including positioning the part and selecting the appropriate zoom magnification for each measurement, and manually adjusts the light levels of the illumination sources until he gets good measurement results. The operator then saves the parameters of each measurement step along with the associated light levels, most often in a computer that will control subsequent automatic measurements. This manual programming method requires a highly skilled operator.

U.S. Pat. No. 6,627,863 to Wasserman describes a method of semi-automatically determining the appropriate levels of the lights in a particular measurement system. This method compares measurements of an actual object made on the machine being programmed and simulated images to set the appropriate illumination light source levels. While this method may reduce the required skill level of the operator and perhaps the programming time, it still ties up a valuable measurement system during programming. The system cannot be used for measuring parts while it is being used for developing part programs.

It is desirable to develop measurement programs in an offline mode, i.e., with the measurement software running on a computer that is not attached to an actual measurement machine. U.S. Pat. No. 7,092,860, also to Wasserman, mentions an automated, offline system. It further mentions a lighting model used to automatically set the parameters for the various lights in the system, but gives no indication as to how such a model could be developed. Developing such a model incorporating multiple light sources and zoom lenses is difficult. The '860 patent does not describe any method for developing the model. It does not describe the steps required. It does not even give an example of the development of such a model.

U.S. Pat. No. 5,389,774 to Gelman and Davis describes an apparatus for calibrating a zoom lens and a calibration method that generates data used for setting a zoom lens to a predetermined magnification setting. The present inventors have discovered that that same data can be used when combined with other data to determine the appropriate compensation of illumination sources in accordance with an aspect of this disclosure.

The '774 patent describes a method of calibrating the magnification of a zoom lens. The calibration is carried out on each combination of a measurement machine, zoom lens, and camera. Referring to that patent's FIG. 2 the zoom lens magnification is changed by driving a servo motor 23 to turn a spur gear 26 attached to the motor shaft. The spur gear 26 engages a ring gear 24. The ring gear 24 surrounds and is attached to the adjustable lens barrel 25. When the lens barrel 25 turns, the magnification of the zoom lens is changed. To calibrate the zoom lens for enabling an operator to return the lens to a predetermined desired zoom magnification, a reticle image is projected at the selected magnification and via the zoom lens and a video camera to a microprocessor, which electronically stores that particular image of the reticle for subsequent use when it is desired to have the now-calibrated magnification reestablished. To reestablish the calibrated magnification at a later time, a new image of the reticle is projected to the CPU and via the CPU to a video screen. The previously recorded image of the reticle is also projected onto the video screen by the CPU and is mathematically compared with the new reticle image. The zoom lens is adjusted until the two images are coincident at which time the previously selected magnification will have been reestablished. As part of the calibration process the '774 patent records the reticle light intensity for each magnification at which the zoom lens is calibrated and the x,y,z coordinates. The reticle light intensity is adjusted during calibration to a satisfactory level to produce a visible image. To return the zoom lens to a pre-calibrated position the reticle intensity is reset to the level saved during the calibration process.

The technique described in the '774 patent is widely used and the parameters stored during calibration of a zoom lens on a particular optical inspection system are commonly available to the operator of the system. The inventors have discovered a way to use this data to simplify the programming of optical imaging systems.

BRIEF SUMMARY OF THE INVENTION

The light intensity signal achieved in the image of an object being measured by an optical imaging system depends on the intensity of light falling on the FOV (field of view) of the optical system, the portion of the light re-emitted from the object being measured within the FOV, the fraction of the re-emitted light that makes its way through the optical system to the camera, and the sensitivity of the camera. Optical measurement illuminators are designed to be uniform across the largest FOV used with the measurement system. The intensity of light falling within the FOV of the optical system will thus not change appreciably when the magnification of the zoom lens is changed. If the object being measured is assumed to be uniform in emission characteristics across the largest FOV, then the intensity of light re-emitted from the object also does not change when the magnification of the zoom lens changes. The main factors that determine the intensity of light on the camera are thus the collection efficiency of the optical system and the sensitivity of the camera. It is an object of this invention to provide a method and apparatus for compensating for the change in the optical efficiency of the zoom lens when its magnification is changed, for compensating for the change in optical efficiency from one zoom lens to another zoom lens, and for compensating for differing sensitivities of various cameras. This invention provides a method and apparatus for using previously determined zoom lens calibration data for a particular system together with optical illuminator data for a category of optical illuminators for providing a very good estimate of the light intensity that is optimum for measurement for an illuminator on a given optical measurement system with various zoom lenses and cameras.

Applicants have discovered that the reticle intensity values available on optical inspection systems having zoom lenses calibrated using the technique described in the '774 patent can be used as part of a process for pre-calibrating illumination sources and thereby permitting illumination light intensities to be set to a near optimal level during training of an optical inspection system. Applicants have found that the illumination source intensities for a category of illuminators are sufficiently constant from machine to machine that the data collected during calibration of an illumination source on a machine using a particular type of source may be used on other machines of the same type using the same type of illumination source when combined with the reticle light intensity data for different zoom magnification's of the particular machine being used. That is, using the '774 patent's data for particular machine and the illumination source light intensity data for the same type of machine and illumination source permits accurate presetting of illumination source on the particular machine.

In accordance with another aspect of this disclosure the inventors have discovered a method for interpolating reticle light intensity values between discrete values determined in the calibration method described by the '774 patent. The inventors have discovered that the relationship between reticle light intensity and magnification varies approximately linearly with the square of the magnification. This allows presetting of illumination light source intensity according to the method described herein without the need for lookup tables to generate an arbitrarily shaped calibration curve.

BRIEF DESCRIPTION OF THE DRAWING FIGURES

DETAILED DESCRIPTION OF THE INVENTION

Figure 1:
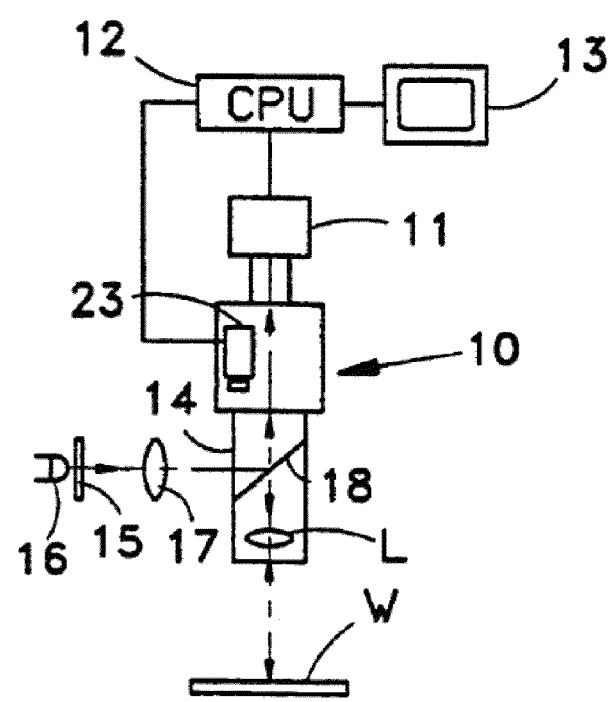
FIG. 1 is a diagrammatic view of an optical measurement system in accordance with an embodiment of this invention.

FIG. 1 is a diagrammatic view of an optical imaging system for measuring part coordinates in accordance with one aspect of this disclosure. Therein, a zoom lens assembly 10 includes a servo motor 23. A video camera 11 is arranged above the zoom lens assembly and is in communication with a central processing unit 12, which communicates with a display 13. A housing 14 is disposed below the zoom lens assembly 10 and houses a beamsplitter 18 and objective lens L. A workpiece W is disposed under the housing 14 on a movable stage. A light source 16 is disposed to emit light that passes through a reticle 15 to project a reticle image through an objective lens 17 to the beamsplitter 18. Although not specifically, shown, the system preferably may include a plurality of illumination sources for illuminating the object. The CPU 12 may be programmed to position the object by adjusting the stage, set the zoom magnification, adjust the illumination levels and automatically determine the location and dimensions of features of the object based on the video signal produced by the camera.

Preferably, the elements of the imaging system 10 are controlled by a computer which may be the same computer that determines the location and dimensions of features of the object. The computer configures the imaging system in accordance with the stored program that sequentially inspects the features of the object. The computer configures the movable stage, sets the configuration of the optical components and the magnification of the zoom lens, and determines the appropriate illumination intensity for each illumination source using the method described herein, and adjusts the illumination sources.

Heretofore, the stored program that controls the optical imaging system has been created by an operator who manually positions the object at a desired location, adjusts the zoom lens and optics to create an image of the feature under test, and then manually adjusts the intensity of each of the illumination sources to provide a suitable signal from the camera, and then stores this configuration in the computer. While this technique has been effective, it has the disadvantages that it requires a skilled operator to create the stored program and requires that development of the part measurement program be carried out on the measurement system itself thereby at least temporarily preventing it from being used to measure parts during the time needed to create the stored program. This invention greatly simplifies the creation of the stored program, reduces the level of skill required, and substantially removes the creation of the program from the optical imaging system on which the program will be carried out.

Figure 2:
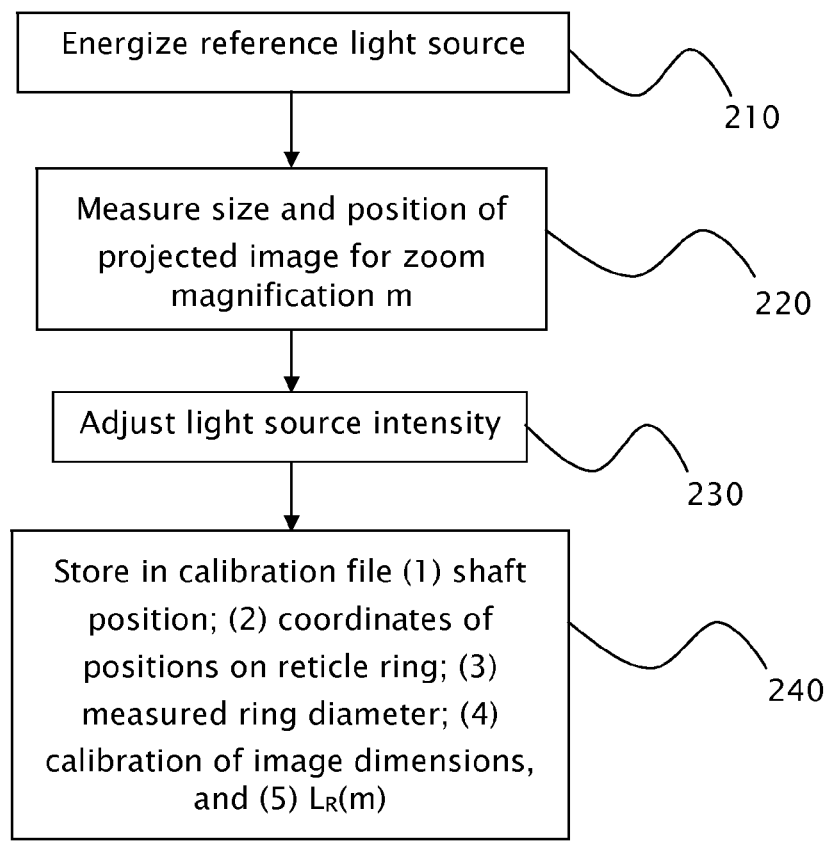
FIG. 2 is a flow chart showing a method of generating a calibration file for a zoom lens in accordance with an embodiment of the invention.

FIG. 2 is a flowchart showing the generation of a zoom lens calibration file that is created for an optical imaging system when a zoom lens is installed on the system. In accordance with an embodiment of the invention, the invention will be described as it would be carried out if the zoom lens had not been previously calibrated. It will be understood that in many or most cases, the zoom lens will have been calibrated in order to carry out the zoom magnification setting described for example by the '774 patent and data derived from that calibration may be used directly without the need for recalibrating the zoom lens to accomplish the illumination light source presetting in accordance with this invention.

Referring to FIG. 1 the process of FIG. 2 is initiated by, at step 210, turning on the reference light source 16, which is preferably a reticle light source, an image of reticle 15 is projected onto the video camera 11 upon reflection by the beam-splitter 18. For each zoom magnification m to be calibrated, at step 220, the size and position of the projected image is measured using known optical measurement methods. Thereafter, in step 230, the intensity of light source 16 is adjusted until the signal at the camera is acceptable for producing an image from which a feature of an object under test can be measured, preferably about sixty percent of the level required to produce saturation of the signal at the camera. After the reticle image is measured, five parameters are stored in step 240: (1) the position of the shaft of servo motor 23, (2) the X-Y coordinates of three points measured on one ring of the reticle image, (3) the measured ring diameter, (4) the calibration of the image dimensions in pixels per inch, and (5) $L_R(m)$ a measure of the reticle light source 16 intensity for that magnification m, scaled to a number between 0 to 255, where 255 represents the maximum intensity to which the reticle light source is allowed to be driven and 0 is the minimum intensity. These data are stored in a calibration file associated with that specific measurement system. As will be understood, other $L_R(m)$ measurements also will be stored in the calibration file for the specific machine M, but at different magnifications m. The magnifications are predetermined, e.g., by the manufacturer or the end user. This portion of the method of this invention may be carried out substantially as described in the '774 patent.

As noted above, the reticle light source intensities $L_R(m)$ for each magnification m are stored in the calibration file and provide a measurement of the relative optical efficiency of the specific system at each magnification. The intensities $L_R(m)$ of the reticle light source required to achieve optimal measurement accuracy at a given magnification m depend on both the optical collection efficiency of the lens at that magnification and the sensitivity of the camera. Thus, each machine M will likely result in a different calibration file, at least because the zoom lens and the camera associated with each machine M will have some variance. Across machines the camera and/or zoom lens may be entirely different, but even cameras and zoom lenses that are the "same," i.e., that have the same part number or specifications, will have inherent differences owing to, for example, manufacturing tolerances. Components other than the camera and zoom lens may also lead to differences between machines.

In some commercially available machines, these calibration files storing the reticle light source intensities $L_R(m)$ for each magnification m are created by the manufacturer and shipped with the machine. Alternatively, the reticle light source intensities could be calculated by the user, using the process of FIG. 2. As should also be appreciated from this disclosure, light intensities for some light source other than the reticle light used in the machine could be used to determine the light levels for setting the light levels of other light sources; however, the calibration file stores intensity values for the reticle light source since the reticle light source is used to calibrate the magnification of the zoom lens. In this description the reference light source used to calibrate the optical efficiency of the measurement system is a reticle light source, but it could be another light source.

Figure 3:
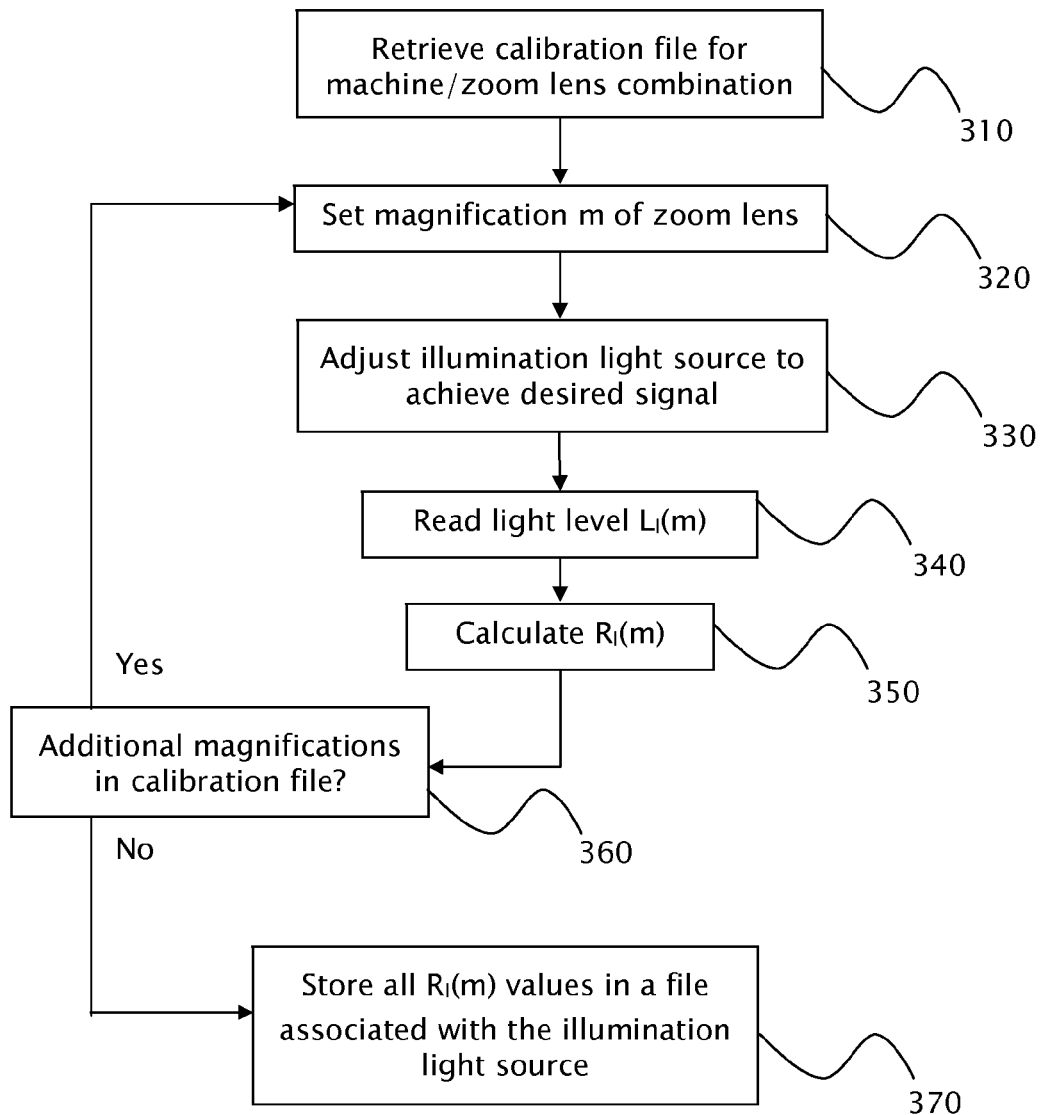
FIG. 3 is a flow chart showing a method of determining the appropriate illumination level for a particular illumination source at a particular zoom lens magnification.

Once the parameters for the zoom lens are established, the illumination intensities $L_{I1}(m)$, $L_{I2}(m)$, $L_{I3}(m)$, . . . , for light sources I1, I2, and I3 . . . , other than the reference light source for the optical imaging system are determined. The reticle light source 16 may be one of the light sources, as may be a ringlight (an oblique light), a backlight, or an co-axial light, for example. To set light levels for a given type of illumination light source it must be calibrated once on a machine preferably of the same type, i.e., having the same camera and zoom lens, as the machine M that will be used to make the measurements in production. Again, there will be variations between the same machine-types, that is, between machines having the "same" zoom lens and camera, but those differences are generally limited enough for purposes of determining the illumination intensities as to not require adjustment. Referring to FIG. 3, the steps for calibrating the illumination light sources are as follows:

1. In step 310, retrieve the calibration file for the machine, which contains the light intensity values $L_{RM}(m)$ for the reticle light source for this machine M at various zoom lens magnifications;
2. In step 320, set the zoom lens to a first magnification, m, given in the calibration file;
3. In step 330, adjust the first illumination light I1 source to achieve a signal at the camera that is a predetermined level, e.g., sixty percent of saturation;
4. In step 340, read the light level $L_{I1M}(m)$, scaled to a number from 0 to 255, for the illumination light source I1 at magnification m;
5. In step 350, calculate $R_1(m)$, the ratio of $L_{I1M}(m)$ to $L_{RM}(m)$ the light level at magnification m from the machine's calibration table;
6. Repeat steps 2 through 5 for each magnification m stored in the calibration file, as determined by the inquiry in step 360; and
7. In step 370, store the values of the ratio $R_1(m)$ in a file associated with this light source I1 for the machine M.

Figure 4:
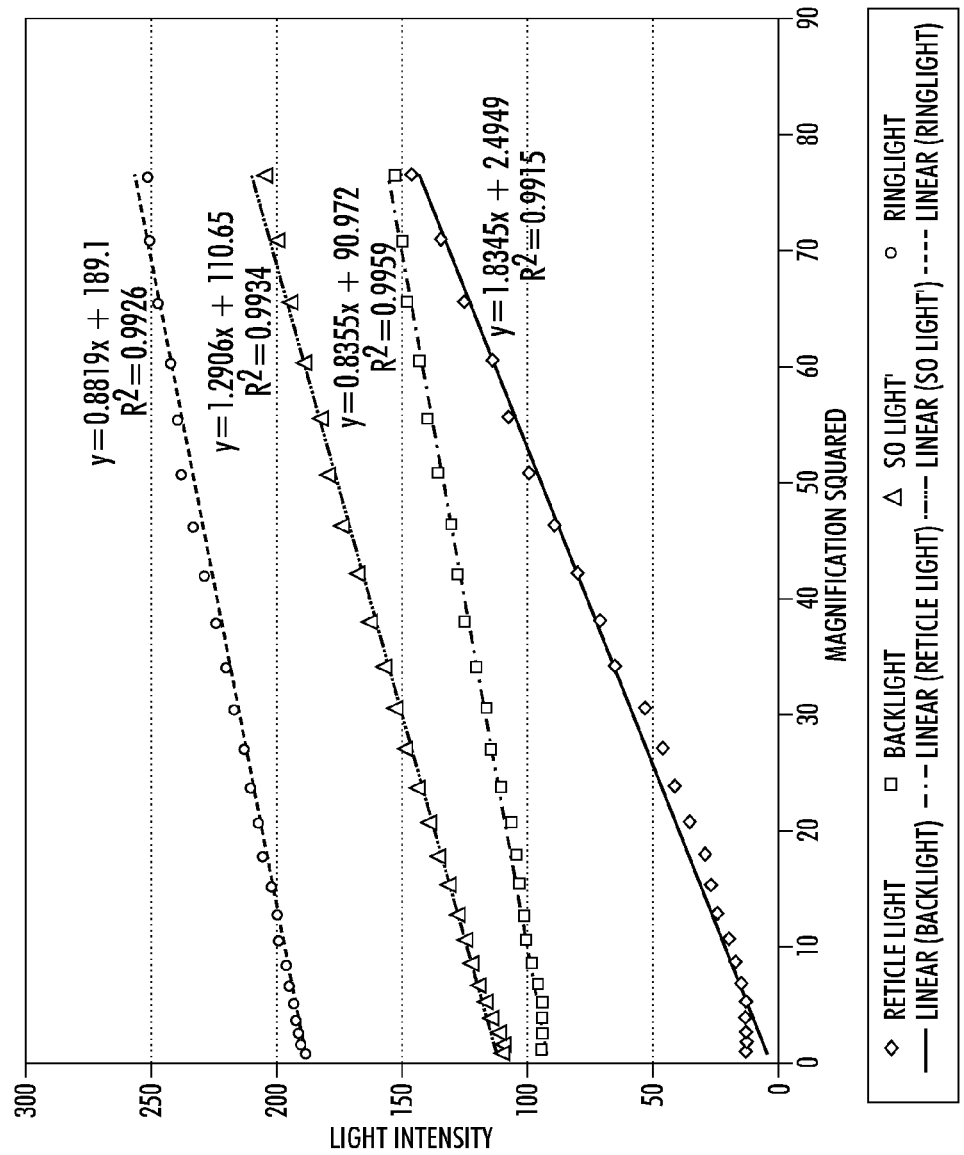
FIG. 4 is a graphical representation of the desired illumination levels of a plurality of different illumination sources in an optical measurement system in accordance with an embodiment of this invention.

Once a light source has been calibrated on one machine of a given type, that is the $R_1(m)$ values are calculated for the machine M having a specific zoom lens and camera, light levels for magnifications m other than those for which the light source has been calibrated can be determined by interpolation. FIG. 4 is a plot of the light intensities $L_{InM}(m)$ for three illumination light sources I1, I2, and I3, namely, a backlight, a co-axial light (SO), and a ringlight, required to achieve sixty percent of saturation at various zoom lens magnifications squared. The light intensity values $L_{RM}(m)$ associated with the calibration file for the zoom lens for the machine M are also plotted as the series labeled "Reticle Light." Note that over most of the magnification range, the light intensity value varies approximately as the square of the magnification. It is thus advantageous to do the interpolation in $m^2$ rather than in m directly. The interpolation can either be calculated based on a linear change in intensity $L(m)$ vs $m^2$ for each magnification as needed or a lookup table with enough entries in m to achieve sufficient accuracy could be prepared beforehand and used to determine the light level required for a given magnification.

In accordance with a presently preferred embodiment of this invention, if the zoom lens calibration file $L_{RM2}$ for an online machine M2 has already been determined, it is not necessary to use M2 to calibrate each type of light for use on M2. A different machine M1 (but of the same or similar type) and light source of the same type can be used to produce the calibration file containing the $R(m)$'s. Thereafter the light intensity value $L(m)$ needed for light sources on machine M2 can be predicted using the zoom lens calibration file for M2 and the values of $L_{RM1}(m)$ associated with that machine used to calibrate the light source, without having to take M2 offline to program the illumination light source intensities.

The procedure is as follows: Let $L_{RM1}(m)$ represent the light intensity values in the machine calibration file for machine M1, the machine on which the light source I was calibrated online, and $R_f(m)$ represent the ratios stored in a file when the light source was calibrated on machine M1 using the procedure represented by FIG. 3. Let $L_{RM2}(m)$ represent the light intensity values for the reticle projector stored in the calibration file for machine M2, the machine on which the light source is to be used online. The light intensity for the light source on machine M2 is given by $$L_{IM2}(m)=R_f(m)*L_{RM2}(m).$$

We have determined that by setting the illumination light source intensity in accordance with this relationship, the intensity is almost always adequate to produce a suitable image for measurement. Occasionally, the illumination light source intensity must be varied slightly to produce a suitable image but this is rare and even in those cases where a change is necessary, the change is relatively small and can be made by an operator without particular expertise.

As discussed above, in the examples given, intensities for the reticle light source are contained in a calibration file. Thus, the reticle light source is the reference light source. This is done for convenience because machines commercially available from the assignee of this invention, Quality Vision International, routinely use the reticle light source to calibrate the zoom lenses. However, the disclosure is not limited to this arrangement. Any other light source may be used as the reference light source, using the teachings of this disclosure.

The time required to program an optical inspection system using the method described herein is substantially less than has been heretofore possible, the method requires less expertise to carry out, and produces good results, often without any tweaking whatsoever.

The invention claimed is:

1. A method for pre-setting a combination of a zoom lens and an illumination source in an optical imaging system having a camera used to inspect objects at a plurality of zoom magnifications m to a near optimum setting during programming of the optical imaging system to inspect objects, comprising:
    determining a desired illumination level of a reference light source in combination with a zoom lens, imaging optics, and an imager in the optical imaging system at a plurality of zoom magnifications;
    creating and storing a calibration file of reference light source intensities for a machine M1 $L_{RM1}(m)$ over the plurality of zoom magnifications m, required to achieve desired measurement accuracy over an area illuminated by the reference light source where L is the normalized intensity of the reference light source, R is a value designating a reference light source, and m is a value representing the magnification of the lens;
    measuring illumination light source intensities for an illumination light source $L_f(m)$ required to produce a signal at the camera that is a predetermined percentage of the intensity required to produce saturation at each magnification m for which the light source I is measured;
    storing an array of values $R_f(m)=L_{IM1}(m)/L_{RM1}(m)$;
    and then, in a measurement step, setting the intensity of an illumination light source I for a machine M2 according to the following relationship:

$$L_{IM2}(m)=L_{RM2}(m)*R_f(m).$$

2. The method of claim 1, wherein the step of creating and storing the calibration file comprises:
    projecting a reticle on a calibration object;
    imaging the reticle with the camera; and
    adjusting the intensity of the reticle light source to produce optimal measurement accuracy at a plurality of zoom magnifications m at a plurality of locations on the reticle.

3. The method of claim 2 in which the reticle is projected at the best focus of the zoom lens.

4. The method of claim 2 in which the step of creating a calibration file is conducted during the manufacture of the machine.

5. The method of claim 1, wherein in $R_f(m)=L_{IM1}(m)/L_{RM1}(m)$, the denominator is interpolated between the stored values of $L_{RM1}(m)$ and wherein in $L_{IM2}(m)=L_{RM2}(m)*R_f(m)$, the value of $L_{RM2}(m)$ is interpolated between the stored values of $L_{RM2}(m)$.

6. The method of claim 5, wherein the interpolation comprises linear interpolation based on the square of the magnification value.

7. A method comprising:
    on a first optical inspection system,
    (a) determining and storing a desired illumination level for a reference light source at a plurality of zoom magnifications m,
    (b) determining a desired illumination level for a first illumination light source at each of said plurality of zoom magnifications m, and
    (c) calculating and storing the ratio of illumination light source intensity to a reference light source intensity at each of said plurality of magnifications m; and
    on a second optical inspection system:
    (d) determining desired illumination levels for a reference light source at a plurality of zoom magnifications m, and
    (e) for a desired zoom magnification, setting the intensity of a first illumination light source to a value substantially equal to the product of the ratio determined in step (c) for that illumination source and magnification and the desired illumination level determined in step (d) for that magnification m.

8. The method of claim 7 in which step (d) comprises retrieving previously determined illumination levels for a zoom lens magnification m from data associated with the second machine.

9. The method of claim 8 comprising retrieving predetermined illumination levels for zoom lens magnifications higher and lower than a desired zoom lens magnification and interpolating an illumination level for from said retrieved levels.

10. The method of claim 9 in which said interpolation comprises linear interpolation based on the square of the magnification values.

11. A method of setting the illumination level of an illumination light source in an optical measurement machine having an associated zoom lens calibration file that includes at least a plurality of reference light source intensity levels for a plurality of zoom lens magnifications comprising:
    determining the ratio of illumination light source intensity level to reference light source intensity levels for at least one illumination light source at a plurality of zoom lens magnifications;
    setting the zoom lens magnification to a desired setting for making a measurement; and
    setting an illumination light source level to a value determined by the combination of the reference light source intensity level for the zoom lens at the desired magnification setting and the ratio at the desired zoom lens magnification.

12. The method of claim 11 comprising interpolating the illumination light source level between two values of reference light source intensity and zoom lens magnification.

13. The method of claim 12 in which said interpolation comprises linear interpolation based on the square of the zoom lens magnification.

* * * * *